Oct. 1, 1957 F. B. MILLER 2,808,253
CONTINUOUS MINER OF THE ROTATING DRUM TYPE
Filed Nov. 8, 1952 4 Sheets-Sheet 3
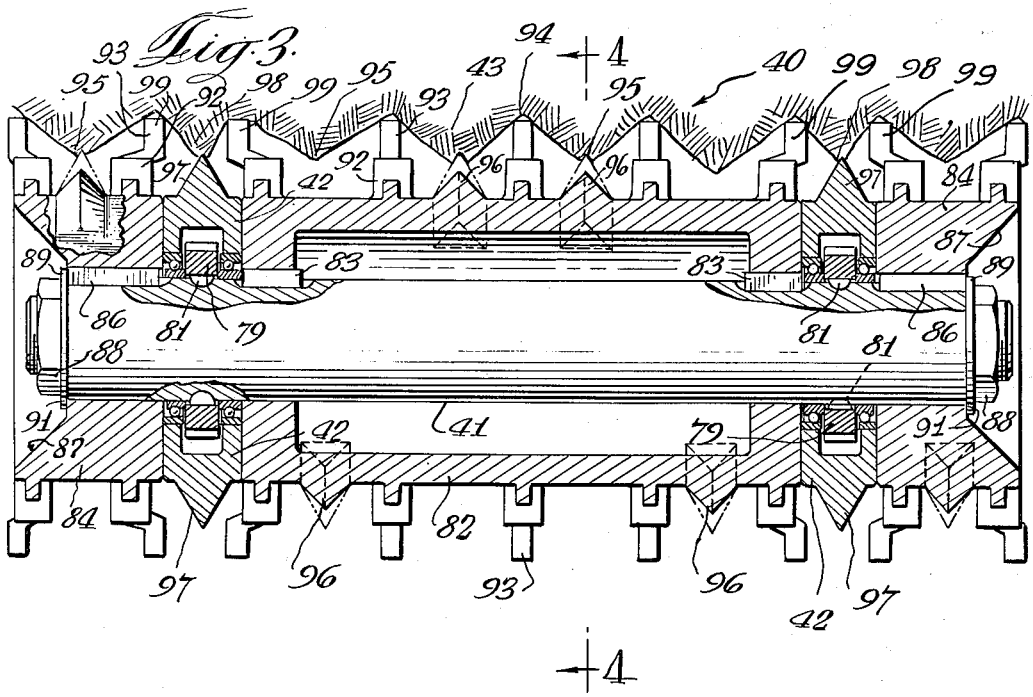
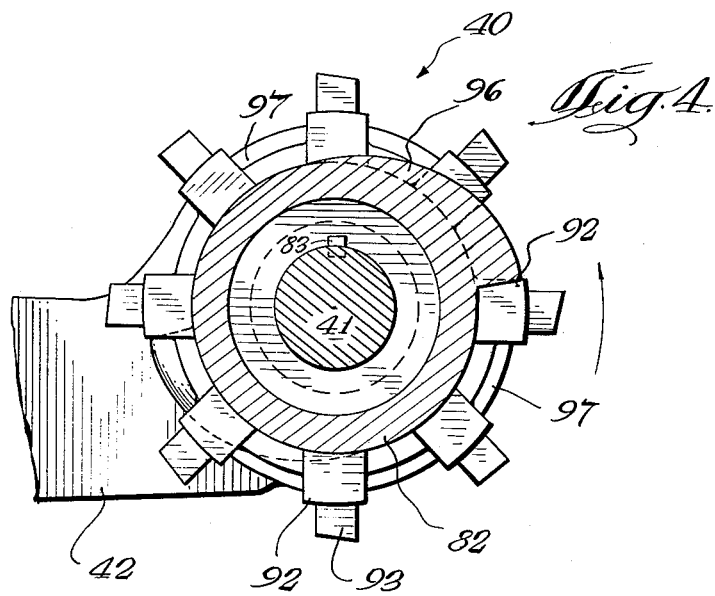
Inventor
Fred B. Miller
By Murray A. Gleeson
Attorney

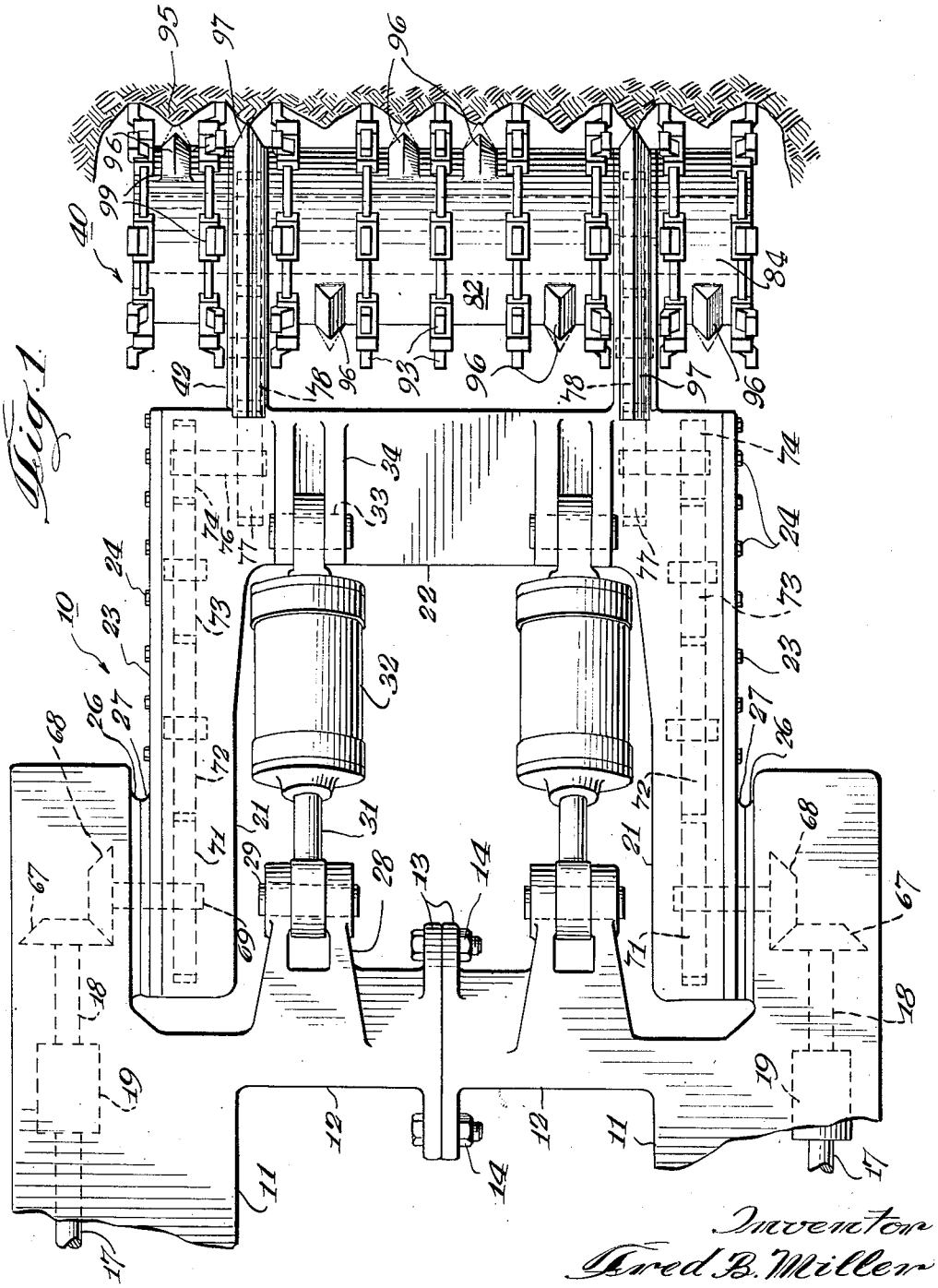

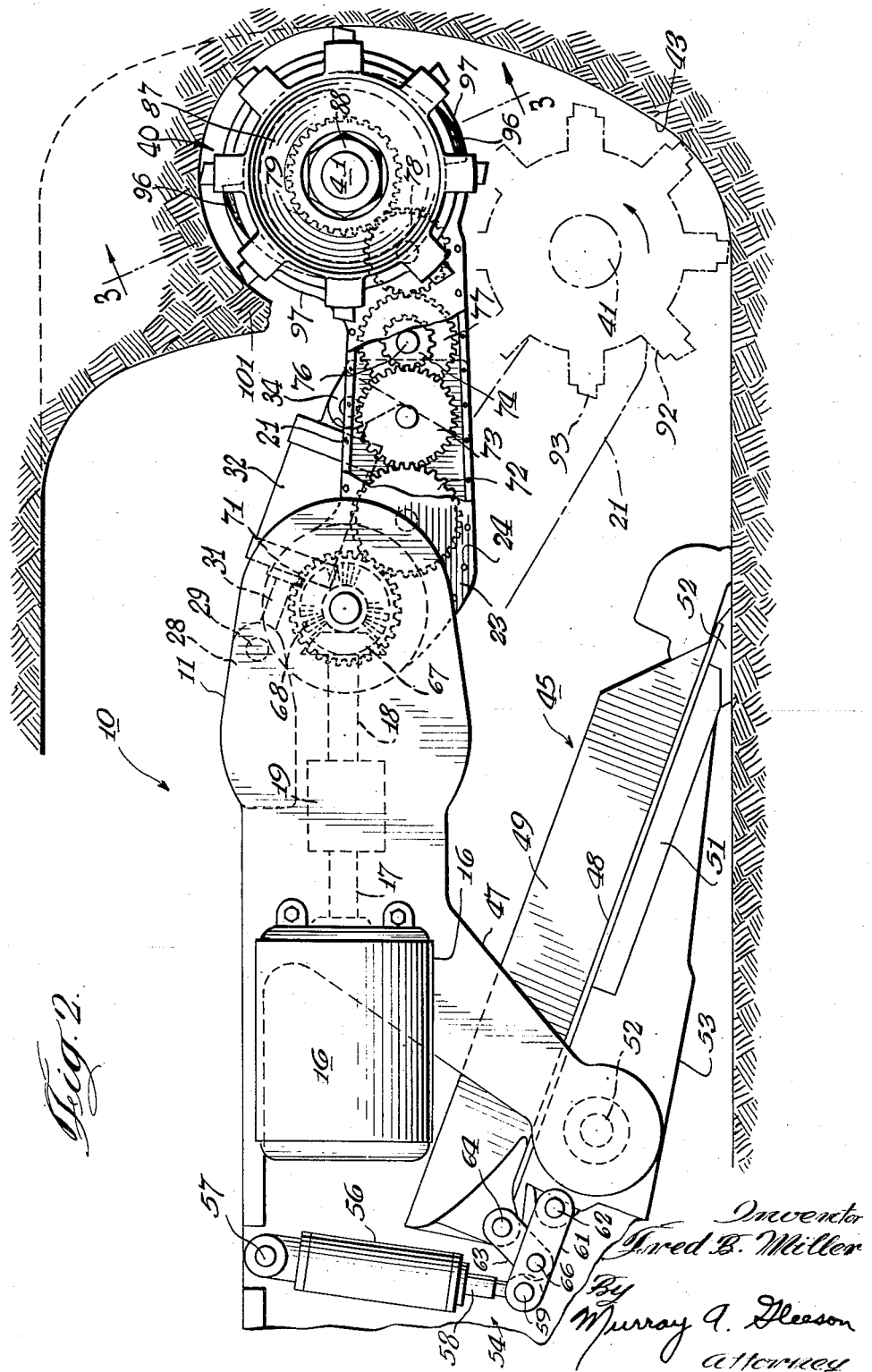

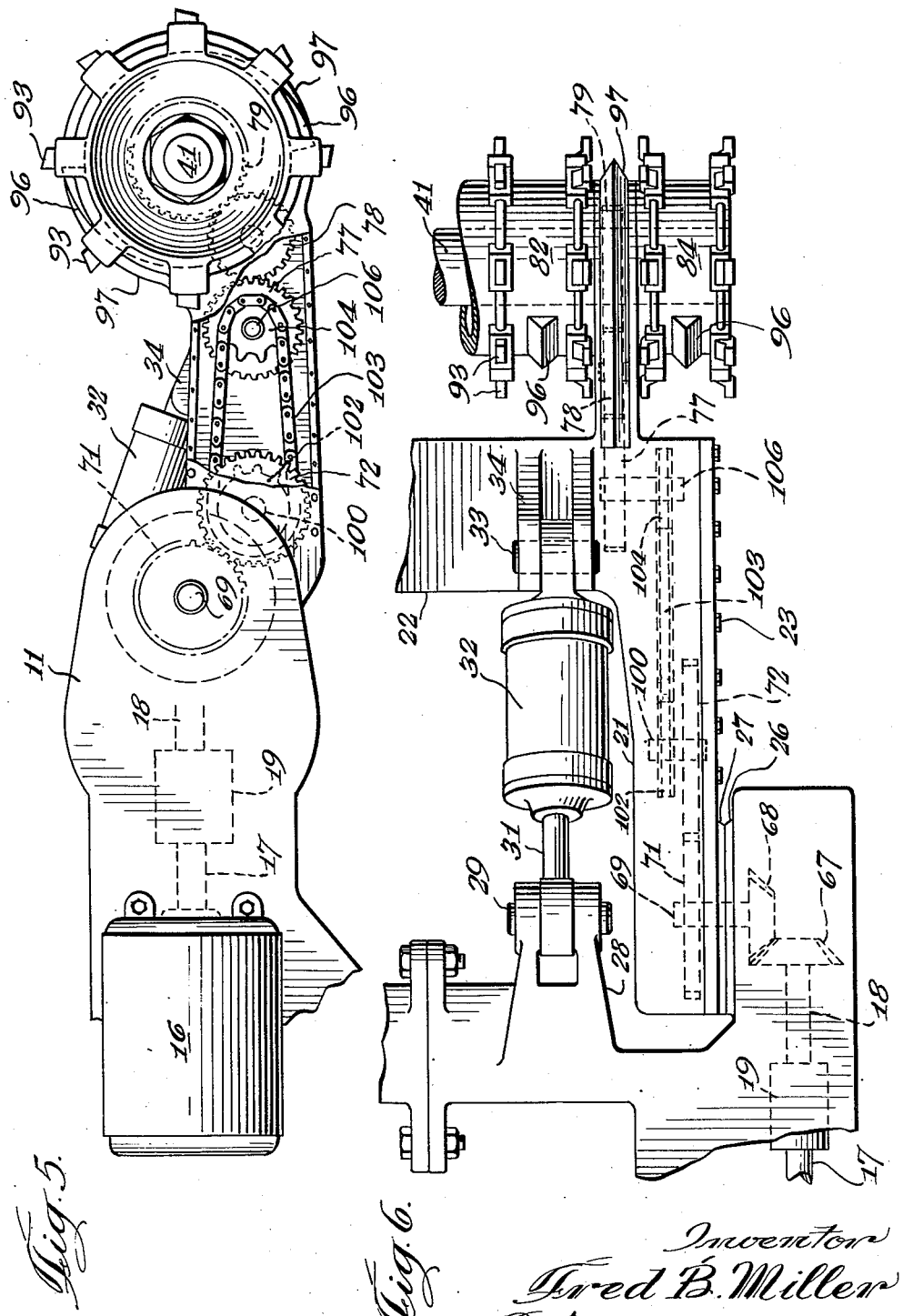

_United States Patent Office_

2,808,253
Patented Oct. 1, 1957

2,808,253

CONTINUOUS MINER OF THE ROTATING DRUM TYPE

Fred B. Miller, Chicago, Ill., assignor to Goodman Manufacturing Company, Chicago, Ill., a corporation of Illinois Application November 8, 1952, Serial No. 319,537

3 Claims. (Cl. 262—9)

This invention relates to machines for continuous mining.

In continuous miners of the type employing rotating cutter supports, such supports have heretofore been driven by chains having cutter bits mounted thereon. The driving chains cut kerfs at the ends of the cutter support so that clearance is provided in moving the support with respect to the seam or vein. The sprockets driven by the cutter chains have been known to become packed with coal causing undue tension upon such chains, sometimes causing them to break. The presence of sulphur balls or other hard spots in the vein have also been known to cause breakage of the chain.

In carrying out the present invention the rotating cutter support is driven by a driving train of gears or a combination of gears and a driving chain which are completely housed against the coal fragmented from the seams. The housing frame for the driving train also performs the function of a support arm for the rotating cutters, and is so arranged as to be offset with respect to a plane containing the center of swiveling movement of the rotating cutter support with respect to the machine and the turning center of the rotating support, so as to provide maximum clearance between the housing frame and the stub of coal which hangs from the roof.

The invention is further characterized by rows of cutter bits, the cutter bits in each row lying in a single plane normal to the turning axis of the revolving support. The cutter bits, instead of cutting a kerf of substantially rectangular cross-section as would be the case with the usual "corn cob" type of cutter bits, cut kerfs substantially of a triangular cross section. In so doing, the cores formed between the kerfs of triangular cross section are likewise of triangular cross section. The triangular cores so formed are arranged to be split by wedging cam surfaces which rotate with the cutter support, and which are located between the cutter bits forming the triangular shaped kerfs. The wedge shaped cams each have a periphery which is eccentric with respect to the turning center of the rotating cutter support, so that as the cutter supports rotate, the cam surfaces will split the triangular shaped cores by a wedging action.

The invention is further characterized by providing the housing frames enclosing the driving trains with wedge shaped surfaces which are arranged to break off wedge shaped cores formed between cutter bits turning with the support and flanking each side of the gear housing frames. Preferably, the cutter bits are offset towards the housing frames, so as to make a wedge shaped core of smaller dimension than the wedge shaped cores formed by the other cutter bits mounted on the rotating support. The housing frame has no rotative movement, but the smaller dimension of the triangular shaped cores formed by the cutter bits flanking the gear housing frame enables them to be readily split by the wedge shaped surfaces on the housing frame, thereby readily permitting the housing frame to enter the seam with the rotating cutter support in sumping, and also to move readily across the seam in an up and down direction.

The reactive force by the seam against the rotating cutter support while moving from the bottom to the top of the seam tends to rock the entire machine in such a fashion so as to lift the discharge end from the mine floor. To overcome such rocking tendency the gathering mechanism disposed at the front of the machine is arranged to provide a counter reactive force.

With the foregoing considerations in mind it is the principal object of the invention to afford a construction for the cutting head of a continuous miner whereby both the sumping and cutting operations may be achieved without the use of driving cutter chains, to the end that the operation of the cutter will not be disturbed in any manner by the presence in the seam of sulphur balls, hard spots or the like.

Another object is to provide an improved cutter head for a mining machine, and to mount such a cutter head upon a pair of swiveling frames which also form a means of housing a driving train for rotatably driving the cutter support. The same frames also provide a means for breaking off cores formed by the action of the cutter bits mounted on the cutter support, to the end that the cutter head and its support frames may readily be sumped into a vein of coal and be moved in an up and down direction with respect to a seam of coal.

A further and important object is to provide in such a cutter head, cutter bits which are arranged to form cores of triangular cross section which may readily be broken by wedge shaped cams which turn with the cutter support, so as to split said cores substantially centrally thereof, thereby resulting in a larger percentage of lump coal than has been possible heretofore.

Still another object is to provide a construction for counteracting the reactive effect against the cutter head so as to prevent the machine from tilting at the discharge end.

Other objects and important features of the invention will be apparent from a study of the specification following, taken with the drawings which together show some preferred embodiments of the invention and what are now considered to be the best modes of practicing the principles thereof. Other embodiments of the invention may be suggested to those having the benefit of the teachings herein, and it is therefore intended that the invention not be limited by the precise embodiments herein shown, nor otherwise than by the scope and spirit of the subjoined claims.

In the drawings:

Fig. 1 is a plan view of a cutter head and support arms therefor of a continuous miner, said cutter head and support arms having embodied therein the improvements according to one form of the present invention;

Fig. 2 is a side elevation view of the cutter head and support arms shown in Fig. 1, showing the motors for driving the same, and a gathering mechanism disposed below the frame of such machines, for loading and gathering material which has been fragmented by the cutter head, said gathering mechanism being constructed so as to oppose the reactive force against the cutter head;

Fig. 3 is a longitudinal cross section taken along the lines 3—3 of Fig. 2, looking in the direction of the arrows;

Fig. 4 is transverse cross sectional view taken along the line 4—4 of Fig. 3 looking in the direction of the arrows;

Fig. 5 is a side elevation view of a cutter head and support arm having embodied therein improvements according to another form of the invention; and Fig. 6 is a partial plan view thereof.

Referring now particularly to Figs. 1 to 4 of the drawings the improvements according to the present invention are embodied in a continuous mining machine referred to generally by reference numeral 10. Such a machine includes side frame members 11 having lateral inward extensions 12 provided with flanges 13 at their inner ends which are joined together by bolts 14. Each side frame member 11 forms part of an enclosure for a drive motor 16 having a motor shaft 17 which is connected to a drive shaft 18 through the medium of a flexible coupling 19. The side frame members 11 also afforded a support for swiveling movement of a pair of housing frames 21, 21 which are joined at the forward end thereof by a hollow transverse rib 22. The housing frames 21 are provided with closure plates 23 which are held thereto as by cap screws 24. Each closure plate 23 and its associated side frame member 11 are arranged to have mating trunnion bearings 26 and 27 so that the housing frames 21 together with their closure plates 23 may swivel with respect to the frame members 11 as a unit.

Means are provided for lifting or lowering the housing frames 21 with respect to the frames 11, and as seen in Fig. 1 each frame extension 12 is provided with a bracket 28 forming a point of connection 29 for a piston rod 31 of a lifting cylinder 32, the cylinder head end of the cylinder 32 being hingedly connected at 33 to a bracket 34 formed as part of the hollow rib 22.

A cutter head, indicated generally by the reference numeral 40, is arranged to turn with a shaft 41 supported within housing frame extensions 42 from the hollow rib 22, and to be driven from the motors 16 as will be described in more detail as this specification proceeds. The cutter 40 is arranged to be advanced by the machine 10 against a coal seam 43 while it is rotating with the shaft 41, so as to cut coal from the seam 43 while being raised by the lifting cylinders 32.

The coal fragmented from the seam 43 falls to the mine floor where it is gathered by a gathering mechanism referred to by the reference numeral 45. The machine 10 is provided with the usual conveying means for transporting the fragmented and gathered coal longitudinally of the machine 10 for discharge on to haulage vehicles or onto other conveying means. The details of such conveying and discharge means form no part of the present invention.

As seen in Fig. 2, the cutter 40 is first sumped in to the seam 43 by advancing the machine 10 along the mine floor. The lifting cylinders 32 are then operated to lift the housing frames 21 together with the housing frame extensions 42 while the cutter 40 is turning in counterclockwise direction. Such operation creates a downward thrust or reacton against the cutter 40 which is transmitted into the machine 10, tending to raise the machine from the floor at points adjacent the discharge end thereof. In order to prevent such tendency of the machine to raise from the floor, the gathering mechanism 45 is arranged to provide a downward thrust against the mine floor which in part tends to overcome the downward reaction against the cutter 40.

As seen more particularly in Fig. 2, the side frame members 11 have arms 47 extending downward and rearwardly therefrom. The gathering mechanism 45 includes a gathering apron 48 having side walls 49 to prevent spillage of material moving along the apron 48. The gathering apron 48 has welded along the bottom side thereof a stiffener member 51 which terminates in a shoe 52 resting upon the mine floor. The arm 47 has a hinge connection at 52 to a vertical stiffener plate 53 depending from the gathering apron 48.

Means are provided for raising and lowering the gathering mechanism 45 in accordance with the undulations of the mine floor and to raise same while tramming the machine 10 from one point to another in the mine. Such raising and lowering means, which is indicated generally by the reference numeral 54, is also arranged to place a thrust against the shoe 52 so as to provide a reaction between the shoe 52 and the mine floor to overcome the reaction against the cutter 40.

As seen in Fig. 2, a double acting cylinder 56 is hingedly connected at 57 to the side frames 11 and has a piston rod 58 which is hingedly connected at 59 to a link 61 having its other end hingedly connected at 62 to the vertical stiffener plate 53. A link 63 is hingedly connected at 64 to the sidewall 49 for the gathering apron 48 and has a pin connection at 66 to the link 61 substantially midway thereof.

The cylinder 56 is double acting, and when the piston rod 58 extends therefrom it will operate to pull the link rod 63 in a downward direction causing the gathering apron 48 to rock about the pivot point 52 on the arm 47 in a counter-clockwise direction, to raise the gathering mechanism from the mine floor.

Conversely, when the piston rod 58 is retracted into the cylinder 56 the link 63 will rotate the gathering apron 48 in a clockwise direction about the pivot point 52 thereby pressing the shoe 52 into engagement with the mine floor. The load against the shoe 52 will be opposed by the reaction from the mine floor which is opposed in sense to the reaction against the cutter 40. It will be seen that the two reactions which are of opposite sense will prevent any tendency of the reaction against the cutter 40 from tending to lift the machine 10 from the floor at the discharge end thereof.

The cutter 40 is driven through the medium of a train of gears supported within the housing frames 21 and the extensions 42 from the hollow rib 22. The gear train includes a miter gear 67 fast to the drive shaft 18 and a mating miter gear 68 fast on a shaft 69 having a gear 71 fast thereupon. Gear 71 drives a train of idler gears 72, 73, and a gear 74 fast upon a stub shaft 76 having a gear 77 also fast thereupon. Gear 77 meshes with an idler gear 78 supported within the hollow extension 42 which in turn meshes with a driving gear 79 made fast to the shaft 41 by means of a key 81.

As seen in Fig. 3, the cutter 40 includes a central section 82 held between the two frame extensions 42 and made fast to the shaft 41 by means of keys 83. The cutter 40 also includes end portions 84 which are made fast to the shaft 41 by means of keys 86. The end portions 84 are counter-sunk at their ends as at 87, and are held in position against the housing extension 42 by means of a nut 88 threaded to the ends of the shaft 41, the nuts 88 bearing against washers 89 which in turn bear against a shoulder 91 of the end portions 84.

It will be seen that the countersinking of the portions 87 enable the ends of the shaft 41 to be recessed within the ends of the cutter 40, so that clearance will be afforded whereby the cutter drum may enter the seam 43.

The central section 82 and the end sections 84 of the cutter drum 40 are provided with holders 92 for cutter bits 93 which are spaced lengthwise of the cutter 40 and also spaced evenly around the periphery thereof as seen in Fig. 4. The cutter bits 93 are not staggered out of the plane of the bit holders 92 as is the practice in the so-called "corn cob" type of cutter, but are located in a single plane. As is known, such "corn cob" types of cutters cut kerfs of substantially rectangular cross section with a core between each kerf also of substantially rectangular cross section.

Each cutter 93 has a rather wide cutting edge as compared to the cutting edge of the cutters employed in a set of "corn cob" cutters. As seen in Figs. 1 and 3, each of the cutters 93 cuts a kerf 94 substantially of triangular cross section leaving a core 96 substantially of triangular cross section therebetween.

The rotating portions 82 and 84 of the cutter 40 are arranged with means for breaking or splitting the cores 95 formed by the action of the cutter bits 93. Such means are in the form of a core breakers 96 formed integrally with the portions 82 and 84. Each of such breakers has a cross section which is triangular in shape when taken on a plane parallel to the axis of the cutter drum 40, and as seen in Fig. 3, and has a periphery which is eccentric with respect to the turning center of the cutter drum as seen more clearly in Fig. 4.

The core breakers 96 are preferably disposed angularly with respect to each other about the portions 82 and 84, so that only a part of the total number are in contact with the cores 95 at any one time.

It will be seen that the apex of each core breaker 96 will contact the apex of each triangular core 95 as the cutter 40 revolves with the shaft 41, causing the breakers 96 to split each core down the middle thereof, thereby increasing the amount of lump coal.

The housing extensions are likewise provided with wedging surfaces 97 which serve to break off cores 98 formed by offset cutter bits 99 which are offset towards the housing extensions 42. By offsetting the cutter bits 99 in the fashion described and as shown in Fig. 3, the triangular shaped core 98 is made of smaller cross section than the other cores 95. Since the housing extensions 42 do not have rotating movement and only the movements incident to being sumped into the seam or the raising movement of the lifting cylinders 32, the smaller wedging breakers of the frame extensions 42 are readily able to break the smaller triangular cores 98.

The line of centers of the idler train of gears in the housing arms 24 and the housing extensions 42 lie below the plane containing the centers of the driving gear 71 and the cutter 40, so that the dimensions of the housing frame 21 may be such so as to permit a stub or lip 101 of coal as seen in Fig. 2, to hang from the seam of coal 43 while having maximum clearance with respect to the housing frames 21.

Referring now particularly to Figs. 5 and 6 of the drawings, there is shown another form of the invention in which the housing frames 21 enclose a combination gear train and driving chain to import rotation to the cutter head 40.

In this second form of the invention parts common to the form shown in Figs. 1 to 4 will be adverted to by the same reference numerals.

In this second form of the invention the gear 72 is made fast on a shaft 100 having a chain sprocket 102 fast thereto. A driven chain 103 is trained around the sprocket 102 and at its forward end around a sprocket 106 made fast to a shaft 106. The gear 77 is also made fast to the shaft 106 and meshes with the gear 78 meshing with the gear 79 fast upon the shaft 41 supporting the cutter head 40.

It will thus be seen that the driving chain 103 and the sprockets 102 and 106 afford an effective means for transmitting power to the cutter head 40 from the driving motors 16, and may be used in lieu of the reaching gears 73 and 74 in the embodiment of Figs. 1 to 4.

In the described arrangements, the cutter 40 is an "up-cutter"; that is, it is sumped in at the bottom of the face and swung up in cutting. It will be understood that the cutter 40 may be arranged as a "downcutter" merely by turning the housing frames 21 and cutter 40 assembly upside down; in which case the stub 101 to be cleared by the housing arms 24 and extensions 42 would be below the head.

While the invention has been described in terms of some preferred embodiments thereof it is intended that the scope of the invention not be limited by the precise embodiments herein shown, and only by the terms of the claims here appended.

I claim:

1. In a continuous mining machine, a frame enclosing a driving train for a revolving cutter mounted at the end of said frame, means for moving said frame together with said revolving cutter with respect to a seam of coal or the like, said frame having an extension enclosing a driving gear for said cutter, cutter bits mounted on said revolving cutter for cutting kerfs in said seam, each row of said cutter bits being disposed in a plane normal to the turning axis of said cutter so as to cut kerfs of triangular cross section with cores formed between said kerfs also having a substantially triangular cross section, and breakers mounted on said revolving cutter in planes intermediate the planes of each row of said cutter bits and having surfaces for splitting said cores as they are formed by the action of said cutter bits, each of said breakers having a triangular cross section on a plane parallel to the axis of said revolving cutter and having their peripheries on a center which is eccentric of the axis of said revolving cutter, said frame extension also having breakers thereon for splitting the cores formed between cutter bits mounted on said revolving cutter on each side of said frame extension, said last named cutter bits being offset toward each other so as to leave cores of smaller dimension therebetween which may readily be removed by the breakers on said frame extension when moving with respect to said seam.

2. In a continuous mining machine, a frame enclosing a driving train for a revolving cutter mounted at the end of said frame, means for moving said frame together with said revolving cutter with respect to a seam of coal or the like, said frame having an extension enclosing a driving gear for said revolving cutter, cutter bits mounted on said revolving cutter for cutting kerfs in said seam, each row of said cutter bits being disposed in a plane normal to the turning axis of said revolving cutter so as to cut kerfs of triangular cross section with cores formed between said kerfs also having a substantially triangular cross section, and breakers mounted on said revolving cutter having surfaces for splitting said cores as they are formed by the action of said cutter bits, the surfaces on each of said breakers being on a center which is eccentric with respect to the turning center of said revolving cutter, said frame extension also having breakers thereon for splitting the cores formed between cutter bits mounted on said revolving cutter on each side of said frame extension, said last named cutter bits being offset toward each other so as to leave cores of smaller dimension which may readily be removed by the breakers on said frame extension when moving with respect to said seam.

3. In a continuous mining machine, a frame enclosing driving means for a revolving cutter mounted at the end of said frame, means for moving said frame together with said revolving cutter with respect to a seam of coal or the like, said frame having an extension enclosing a driving gear for said revolving cutter, cutter bits mounted on said revolving cutter for cutting kerfs in said seam, each row of said cutter bits being disposed in a plane normal to the turning axis of said revolving cutter so as to cut kerfs of triangular cross section with cores formed between said kerfs also having a substantially triangular cross section, and breakers mounted on said revolving cutter having surfaces for splitting said cores as they are formed by the action of said cutter bits, the surfaces on each of said breakers being on a center which is eccentric with respect to the turning center of said revolving cutter, said frame extension also having breakers thereon for splitting of cores formed between cutter bits mounted on said revolving cutter on each side of said frame extension.

References Cited in the file of this patent

UNITED STATES PATENTS

| | | |
|---|---|---|
| 307,751 | Dougine | Nov. 11, 1884 |
| 1,143,897 | Flexner et al. | June 22, 1915 |
| 1,148,975 | Kuhn et al. | Aug. 3, 1915 |
| 1,195,396 | Recen | Aug. 22, 1916 |
| 2,269,781 | Osgood | Jan. 13, 1942 |
| 2,368,863 | Miller | Feb. 6, 1945 |
| 2,630,308 | Moon | Mar. 3, 1953 |
| 2,643,106 | McGowan | June 23, 1953 |
| 2,677,536 | Gleeson | May 4, 1954 |
| 2,692,130 | Ruth | Oct. 19, 1954 |